United States Patent [19]
Hecker et al.

[11] Patent Number: 5,602,799
[45] Date of Patent: Feb. 11, 1997

[54] UNDERWATER DETERRENT SYSTEM

[76] Inventors: George E. Hecker, 703 Kittering Way, Worcester, Mass. 01609; Philip S. Stacy, Nine Rigby Rd., Lancaster, Mass. 01523; Neal A. Brown, 216 Follen Rd., Lexington, Mass. 02173; Michael W. Haberland, 41 Trapper Rd., Sewell, N.J. 08080

[21] Appl. No.: 571,063

[22] Filed: Dec. 12, 1995

[51] Int. Cl.$^6$ ............................................. A01M 29/02
[52] U.S. Cl. .............................................................. 367/139
[58] Field of Search .................................... 367/139, 142, 367/143; 43/17.1; 116/22 A; 181/142, 196, 235, 402, 0.5

[56] References Cited

U.S. PATENT DOCUMENTS

| | | | |
|---|---|---|---|
| 4,624,220 | 11/1986 | Olsson | 181/0.5 |
| 4,922,468 | 5/1990 | Menezes | 367/139 |
| 4,932,007 | 6/1990 | Suomala | 367/139 |
| 4,955,005 | 9/1990 | Loeffelman | 367/139 |

OTHER PUBLICATIONS

F. R. Kundsen, et al, *Journal of Fish Biology* Awareness Reactions and Avoidance Responses to Sound in Juvenile Atlantic Salmon, Salmo Salar L. (1992) 40 523–534.

F. R. Knudsen, et al, *Journal of Fish Biology* Aviodance Responses to Low Frequency Sound in Downstream Migrating Atlantic Salmon Smolt, Salmo salar (1994) 45 227–233.

*Primary Examiner*—Daniel T. Pihulic
*Attorney, Agent, or Firm*—Banner & Witcoff, Ltd.

[57] ABSTRACT

A deterrent system is provided for repelling selected species of aquatic animals from an underwater deterrence zone, for example, from the opening of a municipal or industrial water intake. A conduit for fluid, generally water, has an outlet at the deterrence zone. Intermittent flow means cause one-way fluid flow through the conduit, visiting at the outlet as pulses of fluid alternating with periods of insubstantial fluid flow. The pulses have a volume and flow rate sufficiently in excess of the insubstantial fluid flow to repel the selected aquatic animals from the deterrence zone. The conduit outlet does not serve also as a substantial fluid inlet to the conduit and, rather, the system provides substantial net positive outflow from the conduit outlet over one or more full cycles of the aforesaid pulsed fluid flows alternating with periods of insubstantial fluid flow. Volumetric displacement of water from the deterrence zone can be accomplished without generating a current through the use of an optional inflatable boot or bladder to capture the fluid pulses from the outlet for subsequent recirculation or remote discharge.

26 Claims, 7 Drawing Sheets

UNDERWATER DETERRENT SYSTEM

INTRODUCTION

The present invention is directed to methods and apparatus for repelling aquatic animals from selected underwater areas. More particularly, the invention is directed to methods and apparatus for repelling aquatic animals from selected areas using improved non-physical barriers.

BACKGROUND

Systems have been designed and installed to deter or repel aquatic animals, especially juvenile fish, from underwater areas, for example, the water inlets of hydroelectric and steam electric power plants. Considerable research has been conducted in support of attempts to develop non-physical barriers which are effective against one or more selected species of aquatic animals. Known systems have employed such devices as underwater strobe lights, sound generators and electric fields. Exemplary systems are shown, for example, in Menezes U.S. Pat. No. 4,992,468, Suomala U.S. Pat. No. 4,932,007, and Loeffelman U.S. Pat. No. 4,955,005.

Figure 3:
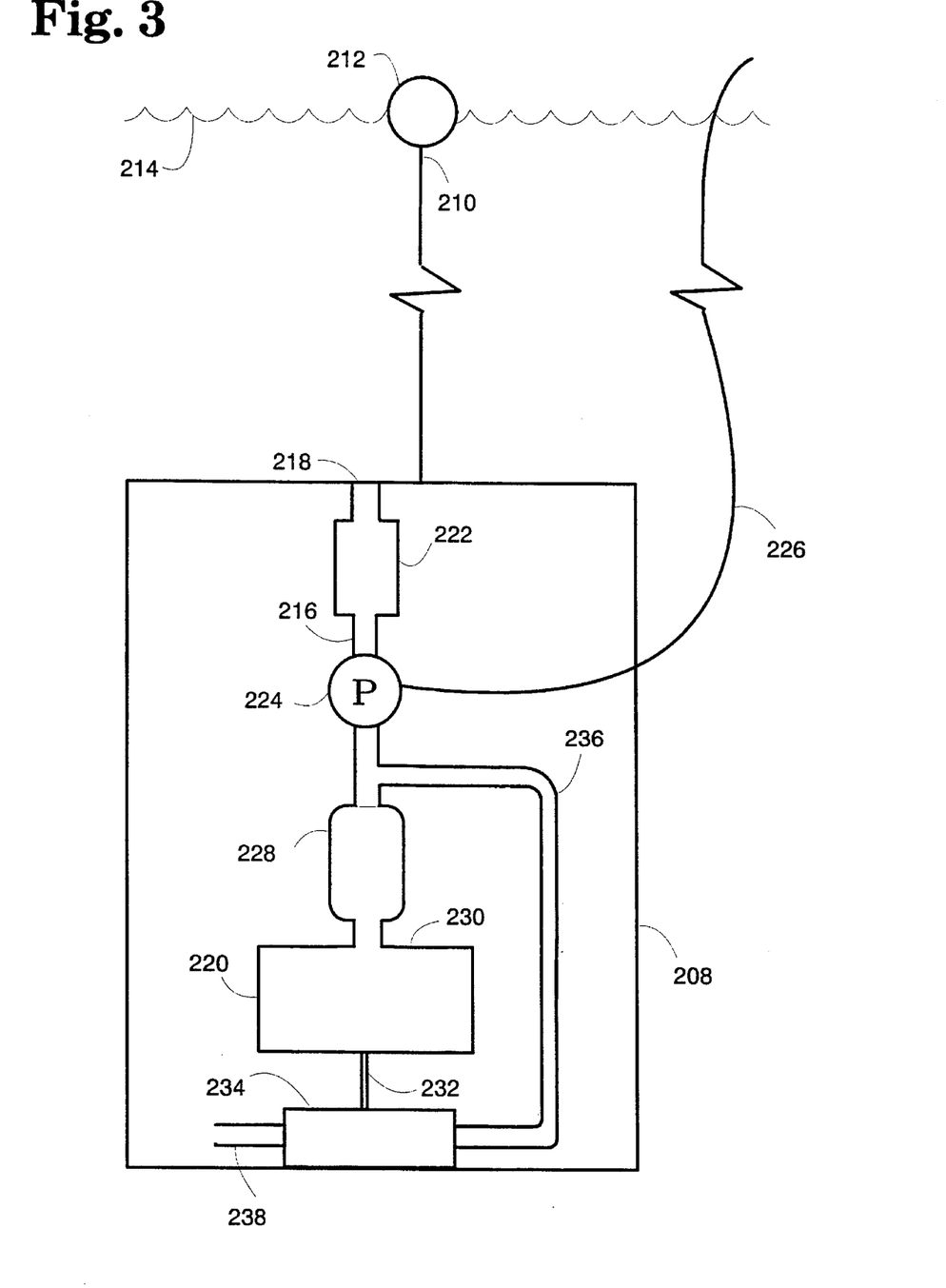
FIG. 3 is a schematic illustration of a deterrent system in accordance with an alternative preferred embodiment.

Good avoidance response is reported to low frequency water particle oscillating motion by downstream migrating Atlantic salmon smolt (*Salmo salar*) in F. R. Knudsen et at, *Journal of Fish Biology* (1994) 45, 227–233. An earlier paper by Knudsen et al on the same topic notes the lack of commercially available means for producing underwater sound or particle motion at frequencies below about 30 Hz. Knudsen et al, *Journal of Fish Biology* (1992) 40, 523–534. A piston device for generating such low frequency motion is shown in FIG. 3 of the more recent Knudsen et al paper, having an upper end exposed to the atmosphere and a lower end submerged below the surface of the water. The piston is mounted at the underwater end of the cylinder, attached to a motor and crank for reciprocating motion with a 4 cm. peak-to-peak travel range. Water is drawn into the cylinder on the back stroke of the piston within the cylinder and is expelled out of the cylinder on the forward stroke of the piston. Results are reported in the Knudsen et al paper for the low frequency (10 Hz.) water particle motion generated by such piston device.

Prior known fish deterrent systems have had insufficient efficacy against all or selected fish species. A system effective in repelling one species may prove ineffective in repelling other target species. In other cases, a system initially effective against one or more target species has grown less effective over time due to habituation. Lack of adequate component durability also has been a problem in certain cases involving such complex componentry. Furthermore, known systems employing electromechanical devices, such as underwater loud speakers, have undesirably high equipment costs and/or installation and operating costs. Operating costs often are a significant factor in determining the commercial suitability of such systems.

Accordingly, it is an object of the present invention to provide a system for repelling selected aquatic animals from an underwater zone, having good efficacy against selected species as well as commercially acceptable durability and costs, including operating costs. Additional objects will be apparent from the following disclosure of the invention and detailed description of certain preferred embodiments.

SUMMARY OF THE INVENTION

In accordance with a first aspect, a system is provided for deterring fish or other selected aquatic animals from an underwater area, that is, by establishing and maintaining a deterrence zone, for example, the area near a municipal or industrial water intake. Means are provided for causing one-way fluid flow through a conduit to be discharged through an outlet at the deterrence zone as pulses of fluid alternating with reduced fluid flow from the outlet. A deterrence zone containing water particles in motion, preferably oscillatory motion, has been found highly effective at repelling aquatic animals, including various species of commercial, sport and forage value. The reduced flow in the intervals between pulses preferably is insubstantial in volume flow rate to provide good efficiency and effectiveness. The fluid flow from the outlet can have any suitable periodicity, either regular or irregular, provided that the volume and flow rate of a fluid pulse is sufficiently in excess of the reduced fluid flow during the alternating periods, in combination with the selected periodicity, to effectively repel the targeted aquatic animal species from the deterrence zone. As used here, a regular frequency or periodicity is intended to mean a simple or non-erratic and non-random pattern of alternating fluid pulses and insubstantial flow, for example, a sinusoidal flow pattern. In general, reference here to a "cycle" of the flow pattern is intended to mean at least one fluid pulse followed by an interval of insubstantial flow from the outlet, regardless whether the flow pattern is regular or irregular.

There is a net positive fluid flow from the fluid outlet over time, that is, over one or more full cycles of fluid pulse followed by an interval of reduced fluid flow. As noted above, the reduced flow preferably has an insubstantial volume flow rate, for example, minor positive flow due to leakage, zero flow or even trivial backflow into the fluid conduit through the outlet, so long as the outlet functions essentially as a monopole and net positive volume source, that is, a pulsating monopole to generate oscillatory volumetric water motion in the deterrence zone at a more than trivial distance from the outlet. Thus, the fluid pulses alternate with insubstantial fluid flow from the outlet so as to cause a time-varying volumetric displacement of water in the deterrence zone. The magnitude and time rate of change of the displacement volume will effect the operating range of the system, and it may be advantageous to use multiple units to cover a large deterrence zone. Those skilled in the art will understand in view of this disclosure, that efficacy of the deterrence system against selected species often will depend on the volume rate of flow from the outlet during a pulse in combination with the periodicity of the pulses, and the time history of the pulse waveform(s). A sufficient volume of water is displaced in the deterrence zone by each pulse to yield sufficient water particle motion in the deterrence zone (as compared to that caused during the intervals of reduced flow) to be perceived by the one or more target species of aquatic animals. Thus, the alternating intervals of flow from the outlet cause oscillatory water particle motion regardless whether a net positive flow from the deterrence zone is created.

Wide variation is possible in the periodicity of the fluid flow from the outlet. The pattern of the recurrent pulses of fluid discharged from the outlet over time may have a single or multiple harmonics. A simple sinusoidal variation in the flow rate may be effective against one selected species of aquatic animal, while a more complex pattern involving multiple harmonics and/or a random component may be more effective against other species. It will be within the ability of those skilled in the art, that is, those who are knowledgeable and experienced in this area of technology, aided by this disclosure, to select suitable periodicity for the fluid pulses within the constraint of having net positive volumetric flow from the outlet of the fluid conduit over one or more full cycles. Generally, the deterrent systems disclosed here, in accordance with preferred embodiments, effectively repel various target species of commercial, sport and/or forage value, with pulse flow of less than 100 Hz, preferably 5 to 50 Hz.

As discussed above, prior known deterrence devices in which flow is reversed back into a conduit or cylinder to prepare a subsequent discharge suffer large oscillatory forces which can cause wear and fatigue leading to lack of long term durability. These and various other known devices and systems often have high power requirements and correspondingly high operating costs and/or design and operating complexity. In contrast, the one-way flow of the present invention avoids the need for generating reverse flow to reload a cylinder for a subsequent pulse discharge. Those skilled in the art will understand that such one-way flow does not necessarily exclude trivial backflow caused, for example, by leakage, fluid transients, the operation of a surge tank (discussed further below) in fluid communication with the fluid conduit upstream of the outlet, etc. Also, it will be understood that one-way flow from the outlet can be part of a closed-loop system, wherein fluid discharged from the outlet is captured for recirculation or remote disposal. Fluid pulses from the conduit outlet can be captured, for example, in a bladder or boot having an exterior surface exposed to the water in the deterrence zone. Inflation of the bladder as it is filled or expanded by the pulse of discharged fluid from the outlet causes the desired displacement of a corresponding volume of water in the deterrence zone in accordance with the principals of the invention set forth above. Thereafter, however, the fluid may be passed from the bladder to a secondary conduit for recirculation or remote disposal. While inflation of the bladder would typically be rapid, corresponding to a high flow rate of fluid from the outlet during a pulse discharge, deflation of the bladder can be either rapid or slow, depending on the desired wave form for particle oscillation motion in the deterrence zone. The fluid flow from the outlet remains in all cases, however, net positive over one or more full cycles. The system with the addition of the bladder and secondary conduit thus performs as a high pass filter, such that in the deterrence zone the average net flow over multiple cycles is suppressed, transmitting or "passing" substantially only oscillating motion with zero mean or near zero mean.

Additional aspects and advantages of the deterrent systems disclosed here will be apparent in view of the following detailed discussion of certain preferred embodiments.

BRIEF DESCRIPTION OF THE DRAWINGS

Various preferred and alternative embodiments of the deterrent systems disclosed here are discussed below with reference to the appended drawings wherein.

DETAILED DESCRIPTION OF CERTAIN PREFERRED EMBODIMENTS

The deterrent system disclosed here is suitable for use in a wide variety of installations. It can be used, for example, to establish an underwater deterrence zone at the inlet of a municipal or industrial water intake. As noted above, a deterrent system as disclosed here may be used either alone or together with additional such units and/or auxiliary deterrent mechanisms, such as strobe lights, sonic generators, etc. Suitable fluids for use in the deterrent system will be apparent to those who are skilled in this area of technology in view of this disclosure, including water which typically is preferred, water based anti-freeze fluid, and the like. Most typically, local water is used, that is, fresh or salt water as the case may be is pumped to the deterrence zone from a remote or proximate location of the same body of water. As further discussed below, the fluid used in the deterrent system also can be recirculated or supplied from an alternative source.

Figure 1:
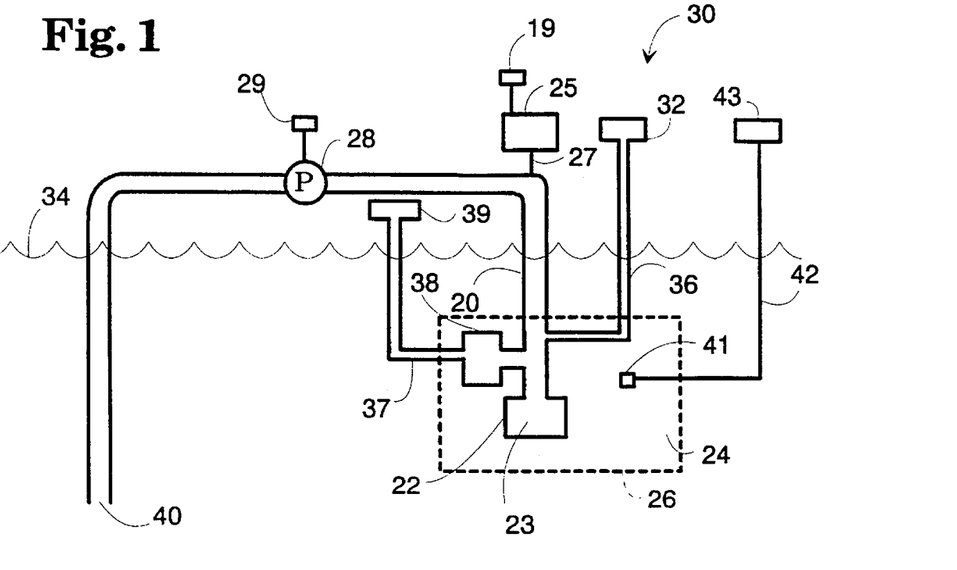
FIG. 1 is a schematic illustration of a deterrent system in accordance with a first preferred embodiment.

A first preferred embodiment of the deterrent system disclosed here is illustrated schematically in FIG. 1. Water conduit 20, which may be, for example, a 4 to 10 inch diameter metal or plastic pipe or the like, has a fluid outlet 22 at a deterrence zone 24 proximate a municipal or industrial water intake 26. The size of the deterrence zone is determined largely by the volume and rate of water pulses from the outlet 22 relative the intermittent periods of reduced flow between such water pulses, and the periodicity of the fluid pulses, as well as the responsiveness or sensitivity of the one or more targeted species of aquatic animals. It will be well within the ability of those skilled in the art aided by this disclosure to select appropriate system parameters and characteristics for a particular installation.

Water is pumped through the water conduit 20 by means of pump 28 which can be positioned at any convenient point along the conduit. Suitable pumps of adequate capacity are readily commercially available including, for example, reciprocating pumps which would provide surges of water through the water outlet 22 with or without the assistance of a flow interrupter fitting or other intermittent flow means, discussed further below, to achieve the objective of a pulsating monopole at the water outlet to generate intermittent water motion in the deterrence zone. Such pumps used without the aid of such intermittent flow means preferably are positioned along the water conduit 20 close to the water outlet 22, such that the surge or pulsing effect is not impeded by lengthy travel through the conduit before reaching the water outlet at the deterrence zone. Pump 28 can be equipped with a controller 29, such as any of the various known and commercially available devices. Controller 29 preferably is a variable speed controller for the pump 28. In those embodiments in which the inlet is proximate the outlet, it may be desirable to use a pulsation suppressor. Such pulsation suppressor preferably is positioned in the conduit near the inlet, between the inlet and the pump.

The preferred embodiment illustrated in FIG. 1 includes a flow interrupter fitting 23 at the water outlet 22, which is driven by electric motor 25. Electric motor 25 has a rotatable output shaft 27 operably connected to the flow interrupter fitting 23. Motor 25 can be equipped with a controller 19. Various suitable motor controllers are commercially available and will be apparent to those skilled in the art in view of the present disclosure. Controller 19 preferably is adapted to provide variable speed control for motor 25. The output shaft 27 optionally is programmably controlled for variable and even non-constant rotation rate of the flow interrupter fitting. Suitable flow interrupter fittings are discussed further below.

In the preferred embodiment illustrated in FIG. 1, an air injection device 30 is provided to force air into the water being pumped through water outlet 22. Air injection device 30 includes an air pump or reservoir 32 which is above water level 34 and feeds air under pressure into an air hose 36 leading to water conduit 20 just above water outlet 22 at the deterrence zone. Air can be pumped into water conduit 20 either continuously or intermittently. If pumped intermittently, it can have the same periodicity as the water pulses from the water outlet 22, or a different periodicity, for example, a counter-cycle periodicity. In general, air injection can be used to amplify the effects of the water pulses and/or to create additional deterrent stimuli targeted at one or more species not adequately repelled by the water pulses.

Particularly in the case of embodiments employing an intermittent flow means, as discussed further below, it may be desirable to provide means for reducing head loss associated with accelerating and decelerating water in the conduit 20. In addition, as the water outlet is closed or restricted between water pulses, water pressure in the conduit may spike to a level sufficient to cause "water hammer" or other undesirable effects. One preferred means for mitigating such water pressure effects is a surge tank 38 in fluid communication with the water conduit 20, as shown in FIG. 1. The surge tank is positioned between the pump 28 and the water outlet 22, preferably immediately upstream of the intermittent flow means. Alternative suitable positioning and configurations will be apparent to those skilled in the art with the aid of the present disclosure. Further, if the surge tank contains air or a spring supported piston or the like of appropriate compressional stiffness, it preferably is tunable to the operating frequency of the intermittent flow means to enhance pulsation amplitude. In the embodiment of FIG. 1, the surge tank 38 is equipped with air pressure line 37 fed by pressurized air source 39, e.g., a controlled air pump or compressed air tank, to tune the surge tank by injecting or releasing air from an air bladder within the surge tank.

Figure 2:
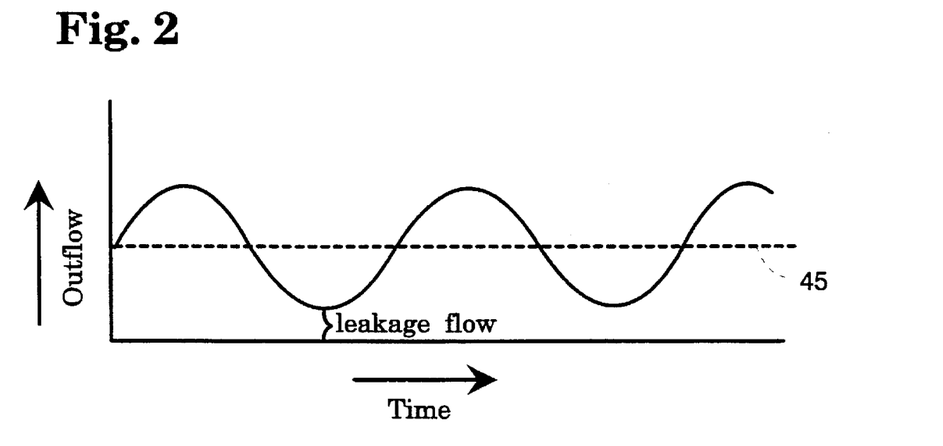
FIG. 2 is a graph illustrating net positive volumetric flow over time from the fluid conduit outlet in the embodiment of FIG. 1.

In the preferred embodiment illustrated in FIG. 1, the water conduit 20 has an inlet 40 remote from the water outlet 22. Further, the water inlet is remote from the deterrence zone 24. In general, the water inlet for conduit 20 must be sufficiently remote, either by spacial separation or other means such as a surge tank, pulsation suppressor, etc., from the water outlet to avoid substantial negation of the pulsating monopole effect generated at the water outlet. A graphical representation of a simple pulsating monopole in accordance with the deterrent system of FIG. 1 is provided in FIG. 2 of the drawings. The vertical axis shows water outflow in terms of volume per unit time, while the horizontal axis shows time. It can be seen that a mono-harmonic, essentially sinusoidal flow pattern includes pulses of high outflow alternating with intervals of reduced flow. Line 45 shows the time average flow over multiple cycles of alternating reduced flow and pulse flow. Even during the periods of reduced flow, it can be seen that there can be substantial positive outflow from the water outlet. The peak rate of outflow during a water pulse, however, is seen to be substantially greater than the level of minimum flow, preferably, for example, at least twice the level of minimum flow. The minimum flow may be referred to as "leakage flow," but may in fact be a designed level of flow to achieve desirable effects in controlling selected species. It will be within the ability of those skilled in the art, particularly with the aid of this disclosure, to select and implement alternative maximum flow, minimum flow and periodicity for the one way water flow from the water outlet. Such alternatives may include, for example, more nearly step function changes in flow rate, multiple harmonics, randomness in the periodicity, etc.

The deterrent system in accordance with the preferred embodiment of FIG. 1 further includes sensor apparatus, specifically, a sensor 41 sending a signal via line 42 to a remote read-out device 43 for sensing the presence of aquatic animals and/or for monitoring the performance of the deterrent system. Suitable sensor apparatus is commercially available and will be readily apparent to those skilled in the art in view of the present disclosure. Optionally, the sensor apparatus can be used in conjunction with control apparatus for the deterrent system, for activation and/or other system performance control, either manually or automatically in response to the sensor signal, in accordance with techniques which will be readily apparent to those skilled in the art in view of this disclosure.

In accordance with one embodiment, a water conduit formed of 6-inch diameter steel pipe extends 50 feet from a remote inlet to an outlet roughly centered in a deterrence zone, and approximately 6 feet from the face of a water inlet for a thermal power plant which draws in 150,000 gallons of water per minute at its maximum flow volume. A centrifugal-type pump having a rated capacity of 600 gallons per minute, pumps water one way through the conduit to the outlet. The water is discharged from the outlet as a pulsating monopole having a substantially sinusoidal periodicity. The minimum flow rate consists of only leakage flow and is trivial in comparison to the maximum flow rate during a water pulse. Such exemplary system is found to be effective to repel juvenile salmon and other fish to a distance of 20 feet from the water outlet. FIG. 3 illustrates an underwater deterrent system in accordance with another preferred embodiment. The embodiment of FIG. 3 is largely self-contained, that is, all operating components of the system are assembled in a cage or housing which is submerged at the deterrence zone. The self-contained, submerged unit may be suspended via cables from a suitable flotation device. Alternatively, it may rest on a submerged platform or other surface, or be tethered to shore. Typically, only one or more power lines, and perhaps sensor and/or control signal lines (in addition to any support or tethering lines), extend from the submerged unit at the deterrence zone to a remote, above water location. Such self-contained submersible units are highly advantageous embodiments, especially in view of the ease with which they can be installed at a desired site. Once installed, they are easily positioned and repositioned. The embodiment illustrated in FIG. 3 is seen to comprise a housing in the form of a structurally self-supporting cage 208, suspended via cable 210 from a flotation device 212 at the water surface 214. A water conduit 216 is mounted to cage 208, extending from water inlet 218 to water outlet 220. An in-line surge tank 228 is provided downstream of pump 224, between the pump and the flow interrupter 30. A suitable in-line surge tank is discussed further below in connection with the embodiment of FIG. 4. In view of the compact nature of the submersible unit, water inlet 218 is located unavoidably close to water outlet 220. To further reduce inlet pulsations, a pulsation suppressor 222 is provided in-line to avoid or reduce any negation of the pulsating monopole effect generated at the outlet 220. The pulsation suppressor 222 is located between water inlet 218 and pump 224. Pump 224 is provided with electrical power cord 226, bringing power from a suitable remote power source. Alternatively, an on-board power source, for example, a storage battery, can be employed. Outlet 220 comprises a flow interrupter fitting 230, driven by output shaft 232 of drive means 234. In the illustrated embodiment, drive means 234 is a turbine or other flow-actuated device. That is, a diverter conduit 236 diverts a portion of the water flow from main conduit 216 to actuate drive means 234. The flow diverted by conduit 236 exits drive means 234 at outlet 238. Suitable drive means can be constructed in accordance with known designs and techniques which will be readily apparent to those skilled in the art in view of the present disclosure. In accordance with alternative embodiments, the drive means 234 may be, for example, electrically powered. As for pump 224, electrical power to drive means 234 may be supplied via a power cord from a remote electrical power source or from an on-board power source. In such embodiments, the pump preferably provides a steady flow, while the surge tank and flow interrupter fitting act cooperatively to create the desired pulse flow from the water outlet. Without wishing to be bound by theory, it presently is understood that the surge tank functions essentially as a low-pass filter, and should be positioned as close as possible to the flow interrupter 230. The inlet 218, even with the pulsation suppressor 222, preferably is located as far as possible from the outlet 220.

Figures 4, 5:
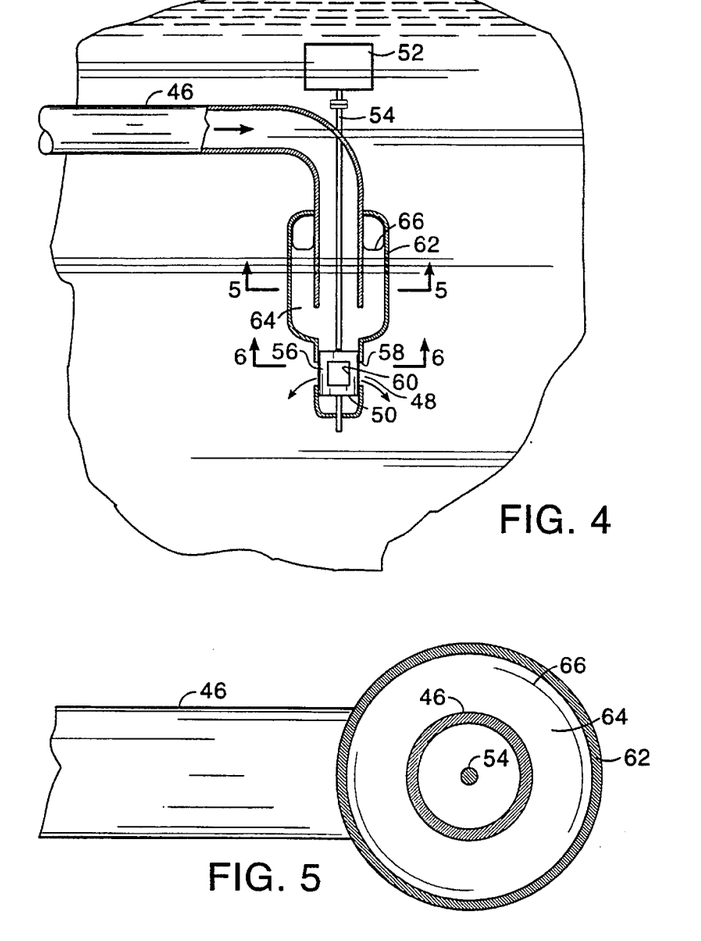
FIG. 4 is a schematic illustration of a portion of a deterrent system in accordance with an alternative preferred embodiment.
FIG. 5 is a section view taken through line 5—5 of FIG. 4.
Figure 6:
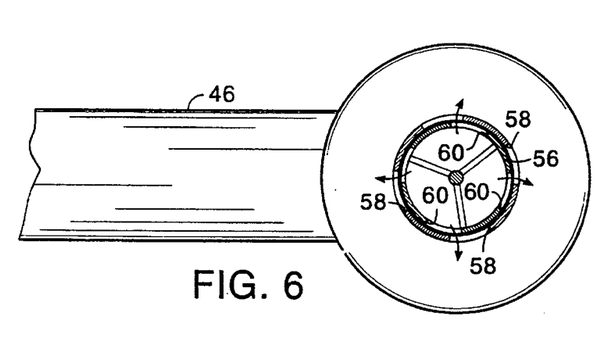
FIG. 6 is a section view taken though line 6—6 of FIG. 4.

Selected components of an underwater deterrent system in accordance with another preferred embodiment are illustrated in FIGS. 4–6. A water conduit 46 extends from a remote water inlet (not shown) to a water outlet 48 located in a deterrence zone. Intermittent flow means are provided in the form of a flow interrupter fitting 50 which is a ported rotary valve, such that one-way water flow through the conduit 46 is emitted through the outlet 48 as pulses of water alternating with intervals of greatly reduced (preferably near zero) flow. Arrows in FIGS. 4 and 6 indicate the water outflow from the flow interrupter fitting 50. An adjustable speed electric motor 52 has a rotatable output shaft 54 which extends partially through conduit 46 to operable engagement with a rotatable cylinder 56 of the flow interrupter fitting 50. As best seen in FIG. 6, rotatable cylinder 56 is co-axial and closely fitting with the conduit 46. As part of the flow interrupter fitting 50, the conduit 46 at the location of cylinder 56 has several circumferentially spaced openings 58. Similarly, cylinder 56 has an equal number of circumferentially spaced openings 60 which are axially aligned with the openings 58. As discussed further below, different configurations of the openings provide different pulse shapes and can be selected for efficacy in a given application. Rotation of cylinder 56 by operation of electric motor 52 alternately aligns and disaligns openings 58 with openings 60 such that water flow through the outlet 48 is ultimately permitted and restricted, thereby generating the desired pulsating monopole having a net positive outflow of water with prescribed time history over multiple cycles from the outlet.

A surge tank 62 is provided in the preferred embodiment of FIGS. 4–6. As best seen in FIG. 5, the surge tank 62 coaxially surrounds conduit 46 immediately upstream of the flow interrupter fitting 50. It provides a chamber 64 at the upper end of which an elastomeric gas-filled bladder, preferably air-filled, is positioned. Water pressure and flow rate spikes within the conduit, most notably those caused by the repeated sudden restriction of water flow by the flow interrupter fitting 50, are intermittently diverted to the surge tank, compressing the gas within bladder 66. When the valve ports of the flow interrupter are in alignment, the compressed air in the bladder expands, driving water from the surge tank to augment the flow through openings 58, thereby increasing the positive pulsation of the exit flow rate. Those knowledgeable in the art will recognize also, in view of this disclosure, that in the course of this process the flow rate through the upstream conduit 46, the pump and the inlet, is maintained with a substantially reduced degree of pulsation. The elastomeric bladder is employed in preferred embodiments to ensure air or other gas in the chamber 64 does not escape over time. It will be appreciated by those skilled in the art that the surge tank illustrated in the preferred embodiment of FIGS. 4–6 is an extremely compact, durable and cost effective design. It is located so as to minimize the mass of water subject to acceleration and deceleration.

Figure 7:
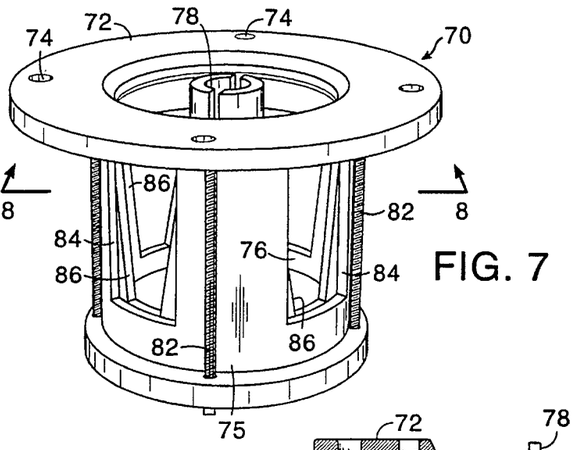
FIG. 7 is a schematic perspective view of one embodiment of a ported rotary valve suitable for use as a flow interrupter fitting in the deterrent systems of FIGS. 1 and 3–6.
Figure 8:
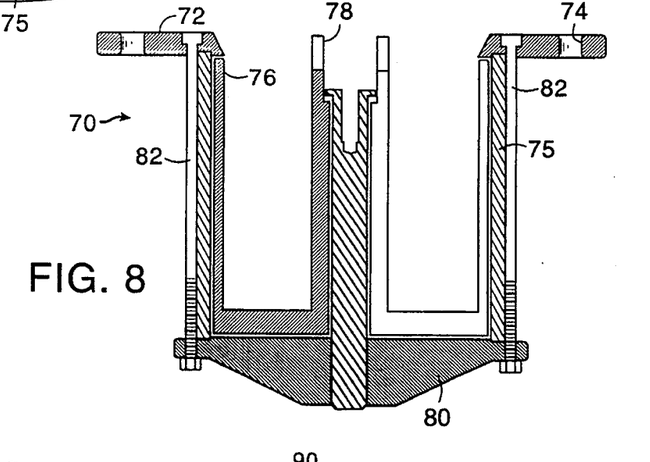
FIG. 8 is a section view taken through line 8—8 of FIG. 7.

A preferred design is illustrated in FIGS. 7 and 8 for a flow interrupter fitting. Specifically, ported rotary valve flow interrupter fitting 70 is seen to comprise a mounting flange 72 suitable for attachment by means of bolt holes 74 or other suitable means to the flanged outlet end of a water conduit, for example, to a flanged end of a surge tank as in the embodiment of FIGS. 4–6. The flow interrupter fitting 70 further comprises a pair of concentrically nested cylinders 75, 76, wherein inner cylinder 76 is rotatable about its longitudinal axis within outer cylinder 75 by means of a driven shaft (as in the embodiment of FIGS. 4–6) received in socket 78 or by other suitable means. The distal end of fitting 70 is closed by bottom plate 80, such that flow through the outlet is substantially closed during the intermittent non-pulse periods. The concentrically nested cylinders are captured between bottom plate 80 and mounting flange 72 by assembly bolts 82.

It can be seen that the outer cylinder 75 has several circumferentially spaced openings 84 and that rotatable inner cylinder 76 similarly has circumferentially spaced openings 86. The openings 84 in the outer cylinder are seen to be substantially rectangular, while the openings 86 in the inner cylinder are somewhat triangular, being more narrow at the bottom (that is, away from the mounting flange 72). The configuration of the openings will impact the profile of the water pulses discharged from the fitting. Specifically, these opening configurations are believed to provide a substantially sinusoidal form to the profile of the water pulses. It will be well within the ability of those skilled in the art to determine empirically the efficacy of different shapes for the openings against one or more targeted species, given the volume and flow rate of the system and the rate of rotation of the inner cylinder. Likewise, the form, number and size of the openings can be varied to produce a desired flow pulse profile, volume and periodicity.

As noted above, certain preferred embodiments employ flow interrupter fittings which do not require a drive shaft or other connection to a motor located above the surface of the water. A submersible electric motor may be used, for example, with either a local, submerged power source or a power cord to a remote power source. Also, a device actuated by the fluid flow may be used, as in the embodiment of FIG. 3. A flow modulating rotary valve can be used, driven by a close-coupled or shaft-coupled hydraulic motor, of either positive displacement or turbine type. Such devices can be operated and controlled by the water flow in the main conduit or by other pressurized water, e.g., as fluid stream diverted from the main flow. Alternatively, such a hydraulic motor may be operated on an hydraulic working fluid, preferably of a type deemed non-injurious to the aquatic environment.

Figure 9:
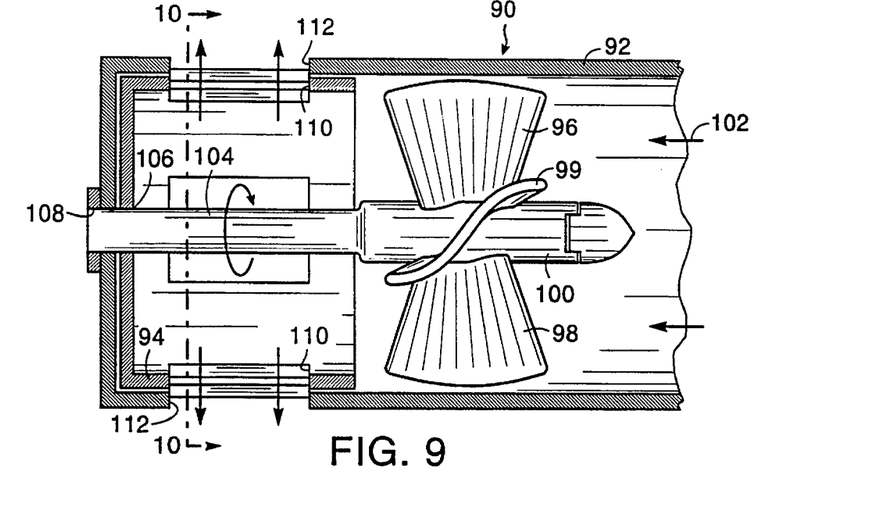
FIG. 9 is a schematic view of a flow interrupter fitting in accordance with an alternative preferred embodiment.
Figure 10:
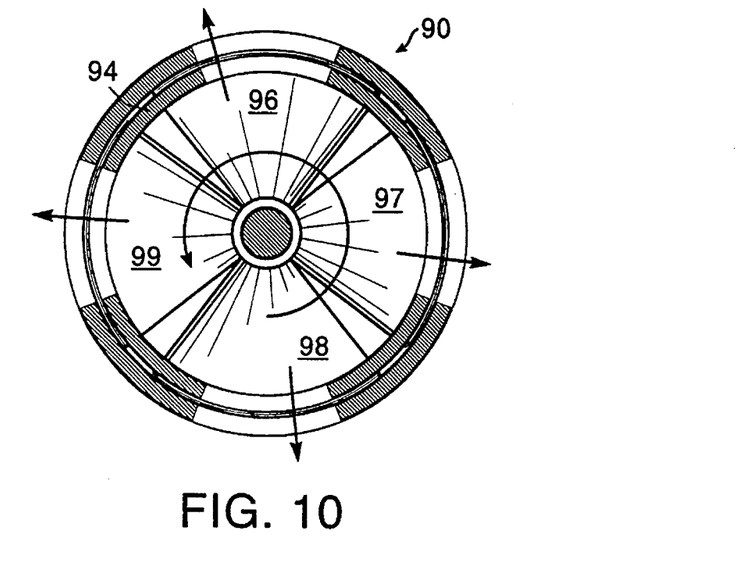
FIG. 10 is a cross-section view taken through line 10—10 of FIG. 9.

An alternative preferred embodiment of a flow interrupter fitting is illustrated in FIGS. 9 and 10. The flow interrupter fitting 90 of FIGS. 9 and 10 comprises concentrically nested cylinders as in the embodiment of FIGS. 7 and 8, wherein outer cylinder 92 is fixed and inner cylinder 94 is rotatably mounted within the outer cylinder 92. Unlike the earlier embodiments, however, in interrupter fitting 90 the inner cylinder 94 is self-rotating. That is, inner cylinder 94 rotates to generate pulsed discharge of water by the action of cylinder propulsion means driven by fluid flow through the fitting. More specifically, the preferred embodiment of FIGS. 9 and 10 has cylinder propulsion means comprising turbine surfaces integral with the rotatable inner cylinder 94. Turbine surfaces 96–99 are circumferentially spaced about mounting hub 100 facing into the direction of fluid flow as indicated by arrow 102. An axial extension 104 of mounting hub 100 is rotatably fixed to inner cylinder 94 by any suitable means at its base 106, and is rotatably received in pocket bearing 108. Thus, the flow of water through the conduit to the fitting acts on turbine surfaces 96–99 to rotate the inner cylinder 94. Openings 110 of the inner cylinder are thereby repeatedly aligned and then disaligned with openings 112 in the outer cylinder 92. With the aid of the present disclosure, those skilled in the art will recognize that numerous alternative designs are possible for self-rotating or otherwise self-actuating flow interrupter fittings suitable for use in the present invention. In addition, a submersible motor or other remotely powered and controlled drive means can be used to drive the flow interrupter fitting.

Figure 11:
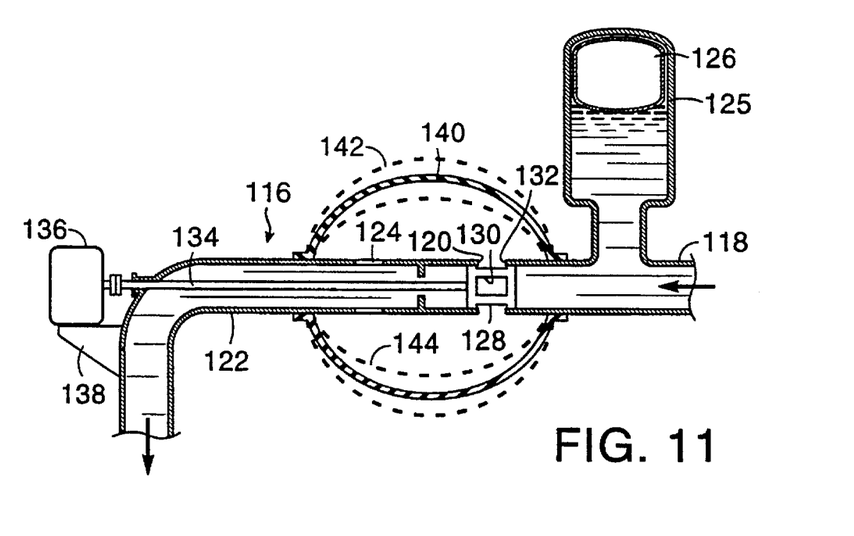
FIG. 11 is a schematic view, partially in cross section, of a portion of a deterrent system in accordance with an alternative preferred embodiment.

An alternative preferred embodiment is illustrated in FIG. 11, which is suitable for recirculation of water or other fluid discharged from the conduit outlet or for remote discharge of such fluid, for example, at a location outside the deterrence zone. Recirculation of the fluid may be desirable, for example, in systems requiring an antifreeze fluid. Remote discharge may be desirable, for example, to avoid creating a steady current from the deterrence zone, to which some species of fish may respond in an undesirable manner. As discussed further below, fluid captured in a bladder can be passed downstream to a secondary conduit following the pulse discharge from the outlet. This may be accomplished by suitable valving which opens fluid communication between the bladder and the downstream conduit after the pulse discharge. In an alternative approach, the fluid is passed from the bladder to the downstream conduit via a passageway which is always open, but is small in comparison to the main conduit fluid outlet. Thus, fluid discharge in a pulse from the outlet begins to pass immediately into the downstream conduit at a slow rate, allowing the bladder to be quickly inflated by the pulse discharge and slowly deflated before the next pulse discharge. In this way, the advantages of intermittent one-way fluid flow from the fluid outlet are achieved together with capture and removal of the fluid from the deterrence zone.

In the embodiment of FIG. 11, a deterrent system 116 is seen to include a fluid delivery conduit 118 having an inlet (not shown) at a location remote from the deterrence zone and an outlet 120 in the deterrence zone. A secondary conduit 122 has an inlet 124 near the outlet 120. The outlet of the secondary conduit (not shown) is remote from the deterrence zone or, in a closed-loop system, simply communicates back with fluid delivery conduit 118. A surge tank 125 is in fluid communication with the fluid delivery conduit proximate the outlet 120, whereby pressure spikes in the conduit are mitigated by repeated, reversible compression of air pocket 126 within the surge tank. Intermittent flow means are provided substantially in accordance with the embodiment of FIGS. 4–10, comprising a rotatable cylinder 128 with circumferentially spaced openings 130 which are alternately aligned and disaligned with corresponding openings 132 at the outlet 120 of the fluid delivery conduit. Cylinder 128 is rotated by means of shaft 134 driven by electric motor 136 mounted on support bracket 138 carried by secondary conduit 122. Thus, in accordance with the operating principles discussed above, rotation of cylinder 128 generates volumetric fluid displacement within the deterrence zone by one-way fluid flow in pulses through the outlet of the fluid delivery conduit. Those skilled in the art will recognize from the discussion above, that various alternative flow interrupter fittings and alternative drive means can be employed with closed loop systems such as the embodiment of FIG. 11. Flow actuated interrupter fittings can be employed, for example, such as that of FIGS. 9 and 10 discussed above, or that of FIG. 12 or FIGS. 13–15, both discussed below.

In accordance with a significantly advantageous aspect of the preferred embodiment illustrated in FIG. 11, the volumetric displacement of water in the deterrence zone is accomplished without generating a current which could produce adverse responses by various aquatic animals, most notably, by attracting species which instinctively swim upstream. More specifically, the embodiment of FIG. 11 comprises an inflatable boot or bladder 140 forming a substantially fluid-tight enclosure about the outlet 120 of the fluid delivery conduit and the inlet 124 of the secondary conduit. Fluid flow in pulses from the outlet 120 temporarily inflates the boot and is contained therein. Dashed line 142 shows an inflated position of boot 140 whereas dashed line 144 illustrates a substantially deflated position. Numerous suitable means will be readily apparent to those skilled in the art, given the benefit of this disclosure, for effecting a fluid-tight seal between boot 140 and the conduits of the deterrence system.

The volume and flow rate of the water pulses discharged at outlet 120 rapidly inflate the boot, thereby displacing water from the deterrence zone in a volume equal or nearly equal to the volume which would have been displaced had the water pulse not been captured within the boot. The captured water within the boot is passed through the inlet 124 of the secondary conduit 122. Inlet 124 is open full time, having a flow rate capacity lower than that of outlet 120.

That is, water is passed through the inlet 124 more slowly than it is discharged from outlet 120 so as to achieve inflation of the boot. The periodicity of the water pulses is coordinated with the relative flow rates, however, to achieve substantial deflation of the boot between water pulses.

Figure 12:
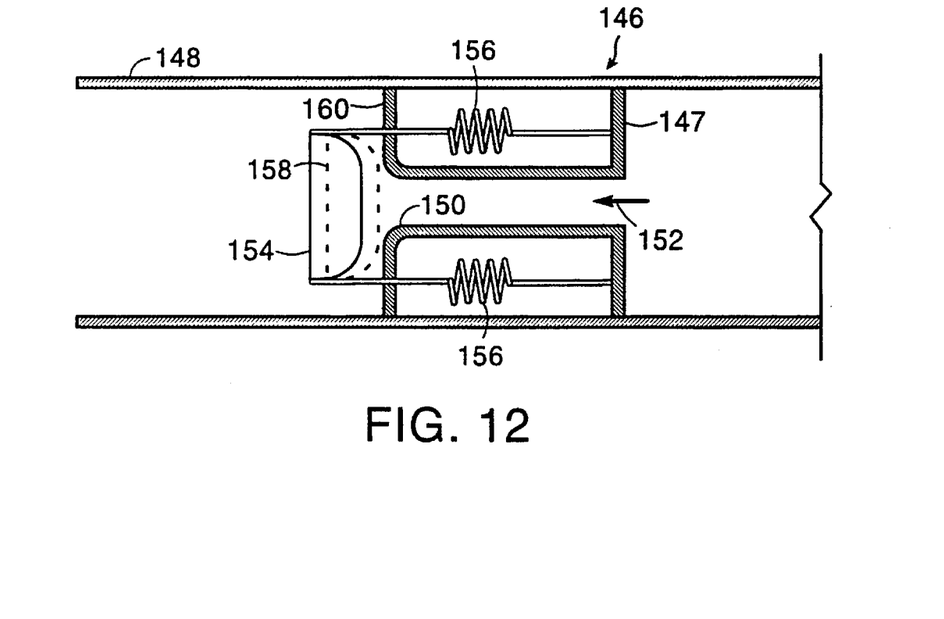
FIG. 12 is a schematic view, partially in cross section, of a flow interrupter fitting in accordance with another preferred embodiment.

An alternative preferred embodiment of a flow interrupter fitting suitable for use in the deterrent system disclosed here is illustrated in FIG. 12. Flow interrupter fitting 146 is self-actuating, that is, one-way fluid flow through the conduit 148 is acted upon by fitting 147 so as to be discharged in pulses alternating with reduced flow from outlet 150 in the direction of flow arrow 152. Fitting 147 comprises a flow blocking member 154 disposed in the fluid flow in conduit 148 mounted for oscillatory movement against a spring bias in response to the fluid flow to alternately open and close the fluid outlet 150. More specifically, flow blocking member 154 is mounted on two or more axially extendable springs 156. Dashed line 158 shows the closed position, wherein blocking member 154 is seated against fixed surface 160. Under action of sufficient fluid force, the bias of springs 156 is overcome and the blocking member is pushed away from surface 160 to permit a pulse flow of fluid to be discharged from outlet 150. This temporarily reduces the fluid pressure acting on the blocking member 154, allowing the springs to once again bias it into the closed position. Fluid pressure then builds and the process repeats. Numerous alternative designs will be readily apparent to those skilled in the art, given the benefit of the present disclosure, for intermittent flow means comprising a serf-actuating flow interrupter fitting wherein a blocking member extending into the oncoming fluid flow is mounted for oscillatory movement against a spring bias.

Figure 13:
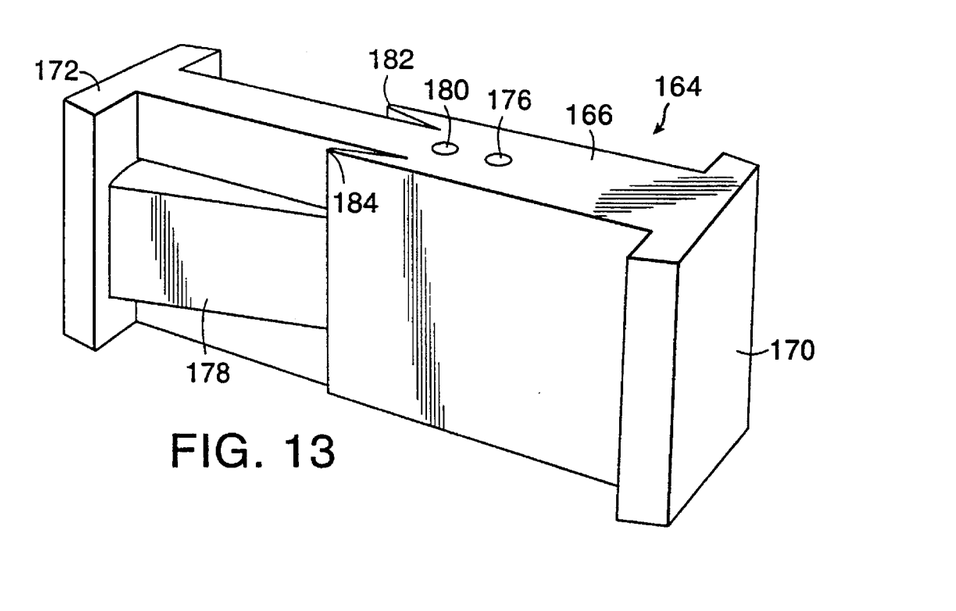
FIG. 13 is a schematic perspective view of an oscillator-type flow interrupter fitting in accordance with another preferred embodiment.
Figure 14:
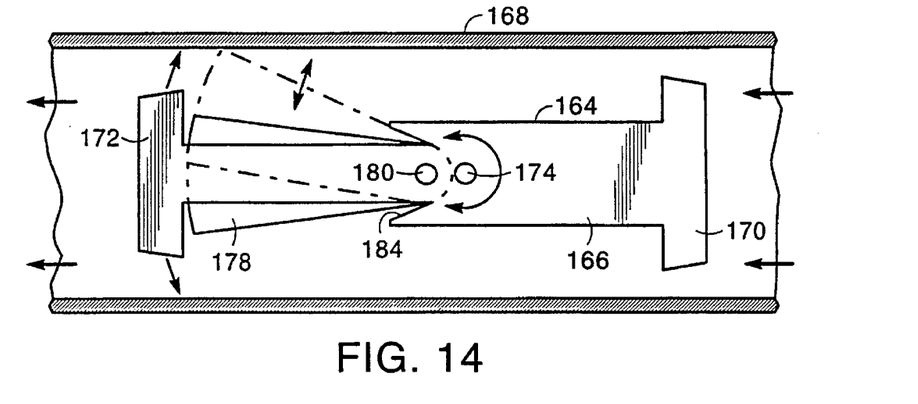
FIG. 14 and 15 are schematic illustrations, partially in cross-section, of the oscillator-type flow interrupter fitting of FIG. 13 in selected operating positions within a fluid conduit of an underwater deterrent system in accordance with the embodiment of FIG. 1.
Figure 15:
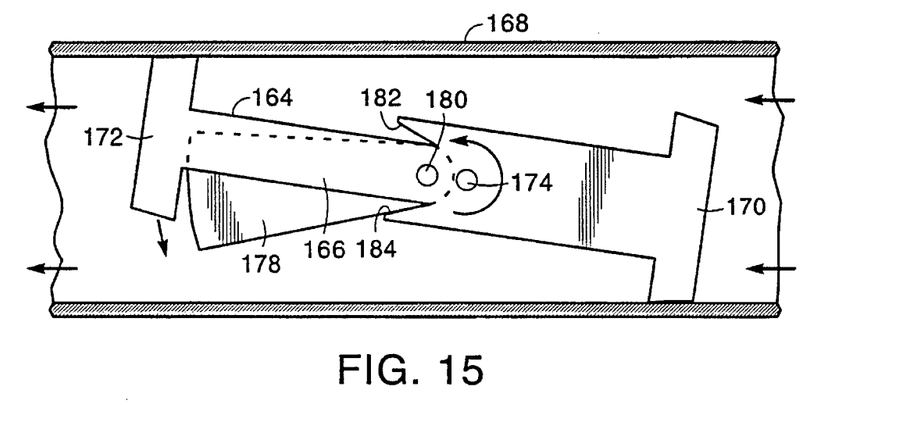

An alternative intermittent flow means is illustrated in FIGS. 13–15 comprising a flow interrupter fitting 164 referred to herein as an oscillator. Oscillator 164 has a connector plate 166 extending axially in a fluid conduit 168. First and second end walls 170, 172 are mounted at opposite ends of the connector plate and substantially perpendicular thereto. The oscillator is pivotally mounted by pivot pin 174 which is received in pin hole 176 extending laterally through the oscillator and secured at opposite ends to the wall of the conduit. The oscillator pivots about pin 174 under the force of the water flowing through the conduit, so as to pivot repeatedly back and forth between first and second meta-stable positions. Oscillator 164 is shown in its first such meta-stable position in FIG. 15. In FIG. 14 oscillator 164 is half way between the first and second meta-stable position. In each of the two meta-stable positions, fluid flow from the outlet is substantially blocked by the seating of the end walls 170, 172 against the inside surface of the conduit 168. At positions intermediate the two meta-stable positions, fluid can flow can past the oscillator, so as to be discharged in pulses in accordance with the principles of the invention discussed above. It will be understood by those skilled in the art that reference here to the oscillator 164 having "meta-stable" positions is intended to mean that the oscillator is driven toward such positions, but the seating of the end walls against the conduit quickly, typically almost instantaneously, builds fluid pressure which then drives the oscillator away from such seated position toward the opposite position.

In accordance with the preferred embodiment illustrated, the oscillator 164 further comprises a destabilizer 178 pivotally mounted in the connector plate 166. The destabilizer is pivotally mounted by pin 180 for movement back and forth between mechanical stops 182, 184. In FIG. 14 the destabilizer 178 is shown centered between mechanical stops 182, 184, and is shown in dashed line seated against stop 182. In FIG. 15, destabilizer 178 is seated against stop 184. The destabilizer contributes to movement of the oscillator back and forth between its meta stable positions. As seen in FIG. 15, fluid pressure on the upper side of the oscillator (as viewed in FIG. 15) will build, while fluid pressure below the oscillator (which is in fluid communication with the outlet of the conduit) will decrease. In response to the resulting fluid pressure differential, destabilizer 178 will pivot downwardly (as viewed in FIG. 15) to stop 184 and thereby transfer momentum to the oscillator toward its opposite meta-stable position. Those skilled in the art will recognize that numerous alternative design variations are possible for oscillators in general conformity with the principals of operation disclosed here.

Figure 16:
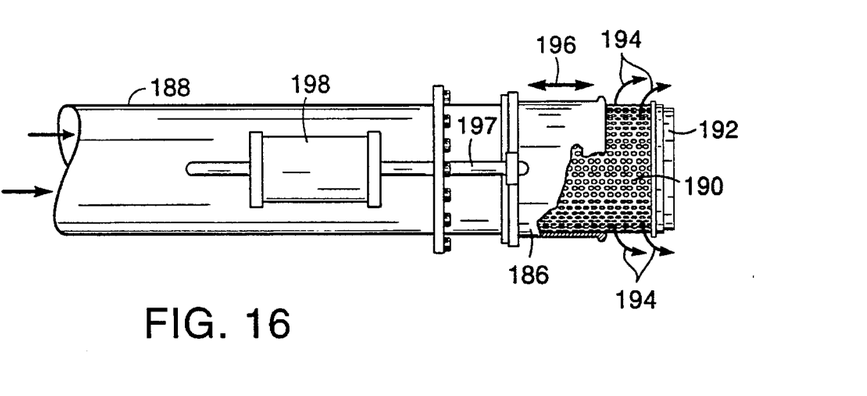
FIG. 16 is a schematic view of a flow interrupter fitting in accordance with an alternative preferred embodiment.

An alternative preferred embodiment is illustrated in FIG. 16, comprising a tubular shield 186, shown partially broken away, mounted concentrically with the fluid conduit 188 for back and forth axial travel on the conduit to alternately cover and uncover screened fluid outlet 190. The end face of outlet 190 is covered by plate 192, such that fluid flow is permitted only through the tubular screen as indicated by arrows 194. The back and forth axial travel of the shield, indicated by bi-directional arrow 196 is controlled by shaft(s) 197 driven by a linear actuator 198 mounted to the conduit 188. When axial shaft 197 is driven to the left (as viewed in FIG. 16) the outlet of the deterrent system is uncovered, allowing water or other fluid to flow from the outlet 190 into the deterrence zone. Subsequent travel of the axial shaft 197 to the right moves the shield correspondingly to the right to cover the screened outlet 190, thereby blocking or at least substantially reducing flow from the outlet. Those who are skilled in this area of technology will understand that the speed at which the tubular shield reciprocates will determine the periodicity of the fluid pulses discharges from the outlet.

In view of the foregoing disclosure, those skilled in the art will readily understand that modifications and additions can be made to the various preferred embodiments discussed in detail above. The following claims are intended to cover the true scope and spirit of the invention, including such modifications and additions.

We claim:

1. An underwater deterrent system for repelling selected aquatic animals from a deterrence zone, comprising:

a fluid conduit having a fluid outlet at the deterrence zone; and     intermittent flow means for causing one-way fluid flow through the fluid outlet as pulses of fluid alternating with reduced flow, the pulses of fluid having (a) volume and flow rate sufficiently in excess of the reduced flow and (b) periodicity which are effective, in combination, to repel selected aquatic animals from the deterrence zone.

2. The underwater deterrent system for repelling selected aquatic animals from a deterrence zone in accordance with claim 1 wherein the intermittent flow means comprises a pump for pumping fluid through the fluid conduit to the fluid outlet and a flow interrupter fitting at the fluid outlet.

3. The underwater deterrent system for repelling selected aquatic animals from a deterrence zone in accordance with claim 2 wherein the flow interrupter fitting comprises a pair of concentrically nested cylinders each having circumferentially spaced flow openings, one of the cylinders being rotatable relative the other about a cylinder axis to alternately align and disalign the flow openings of the one cylinder with those of the other cylinder, fluid flow from the fluid outlet being substantially restricted when the flow openings are not aligned.

4. The underwater deterrent system for repelling selected aquatic animals from a deterrence zone in accordance with claim 3 wherein the intermittent flow means further comprises an electric motor having an output shaft operatively coupled to the flow interrupter fitting to rotate the one cylinder relative the other cylinder.

5. The underwater deterrent system for repelling selected aquatic animals from a deterrence zone in accordance with claim 3 wherein the flow interrupter fitting further comprises cylinder propulsion means driven by fluid flow through the fluid conduit for rotating the one cylinder relative the other cylinder.

6. The underwater deterrent system for repelling selected aquatic animals from a deterrence zone in accordance with claim 5 wherein the cylinder propulsion means comprises turbine surfaces integral with the rotatable cylinder.

7. The underwater deterrent system for repelling selected aquatic animals from a deterrence zone in accordance with claim 2 wherein the intermittent flow means comprises a flow blocking member extending into the fluid flow and mounted for oscillatory movement against a spring bias in response to the fluid flow to alternately open and close the fluid outlet.

8. The underwater deterrent system for repelling selected aquatic animals from a deterrence zone in accordance with claim 2 wherein the intermittent flow means comprises a shield concentric with the fluid conduit and mounted for back-and-forth axial travel on the fluid conduit to alternatively cover and uncover the fluid outlet.

9. The underwater deterrent system for repelling selected aquatic animals from a deterrence zone in accordance with claim 2 wherein the flow interrupter fitting comprises an oscillator extending longitudinally in the fluid conduit and being pivotally mounted in the fluid flow for pivoting repeatedly in response to the fluid flow back-and-forth between first and second meta-stable positions, at each of which positions fluid flow from the outlet is substantially blocked and between which positions fluid can pass the oscillator.

10. The underwater deterrent system for repelling selected aquatic animals from a deterrence zone in accordance with claim 9 wherein the oscillator comprises a destabilizer pivotally mounted in the oscillator for movement in response to fluid pressure in the fluid conduit upstream of the oscillator.

11. The underwater deterrent system for repelling selected aquatic animals from a deterrence zone in accordance with claim 1 wherein the intermittent flow means comprises a constant displacement pump for pumping fluid in surges through the fluid conduit to the fluid outlet.

12. The underwater deterrent system for repelling selected aquatic animals from a deterrence zone in accordance with claim 1 wherein the fluid conduit has a fluid inlet remote from the fluid outlet.

13. The underwater deterrent system for repelling selected aquatic animals from a deterrence zone in accordance with claim 1, further comprising:
   a return conduit which cooperates with the fluid conduit to define a closed-loop flow path for the fluid, the return conduit having a fluid inlet near the fluid outlet; and
   a boot forming a substantially fluid-tight enclosure about the fluid outlet and fluid inlet, being temporarily inflatable by fluid of each of the pulses of fluid from the fluid outlet before said fluid passes from the boot through the fluid inlet into the return conduit.

14. The underwater deterrent system for repelling selected aquatic animals from a deterrence zone in accordance with claim 13 wherein the fluid inlet is open full time to pass fluid from the boot into the return conduit at a rate lower than the flow rate of said pulses of fluid into the boot from the fluid outlet.

15. The underwater deterrent system for repelling selected aquatic animals from a deterrence zone in accordance with claim 13 wherein the boot is substantially deflated between each of said pulses of fluid.

16. The underwater deterrent system for repelling selected aquatic animals from a deterrence zone in accordance with claim 1 wherein the fluid is water.

17. The underwater deterrent system for repelling selected aquatic animals from a deterrence zone in accordance with claim 1 wherein the periodicity is a regular monoharmonic frequency between 5 and 50 Hz.

18. The underwater deterrent system for repelling selected aquatic animals from a deterrence zone in accordance with claim 1 further comprising air injection means for passing air through the fluid outlet with the pulses of fluid.

19. The underwater deterrent system for repelling selected aquatic animals from a deterrence zone in accordance with claim 1 further comprising a surge tank in fluid communication with the fluid conduit.

20. An underwater deterrent apparatus for repelling selected aquatic animals from a deterrence zone, comprising:
   a fluid conduit having a fluid outlet at the deterrence zone and a fluid inlet remote from the deterrence zone; and
   intermittent flow means for displacing water from the deterrence zone by causing one-way fluid flow through the fluid conduit emitted as pulses of fluid from the fluid outlet, the pulses of fluid having a volume, flow rate and periodicity effective, in combination, to repel selected aquatic animals from the deterrence zone.

21. An underwater deterrent apparatus for repelling selected aquatic animals from a deterrence zone comprising:
   a water conduit having a water outlet at the deterrence zone and a water inlet remote from the deterrence zone;
   a pump for pumping a flow of water one-way through the water conduit from the inlet to the outlet;
   a surge tank in fluid communication with water in the water conduit;
   a flow interrupter fitting for intermittently reducing the flow of water from the outlet, having an open flow position and a flow reducing position, the open flow position permitting pulses of fluid flow from the outlet having a flow rate substantially greater than the flow rate of fluid from the outlet permitted by the flow reducing position; and
   means for moving the flow interrupter fitting alternatively to its open flow position and its flow reducing position.

22. An underwater deterrent apparatus for repelling selected aquatic animals from a deterrence zone, comprising:
   a fluid delivery conduit having an outlet at the deterrence zone;
   a secondary conduit having an inlet near the outlet of the fluid delivery conduit, and having a secondary conduit outlet remote from the deterrence zone;
   intermittent flow means for displacing water from the deterrence zone by one-way fluid flow in pulses through the outlet of the fluid delivery conduit alternating with reduced fluid flow from said outlet, the pulses having (a) volume and flow rate sufficiently in excess of the reduced flow and (b) periodicity which are, in combination, effective to repel selected aquatic animals from the deterrence zone; and a boot forming a substantially fluid-tight enclosure about the outlet of the fluid delivery conduit and the inlet of the secondary conduit, whereby fluid flow through the outlet temporarily inflates the boot and is contained therein and passes therefrom through the inlet of the secondary conduit, wherein 1) fluid is passed through the inlet of the secondary conduit more slowly than fluid is passed through the outlet of the fluid delivery conduit into the boot during one of said pulses, and 2) the boot is substantially deflated between the pulses.

23. An underwater deterrent system for repelling selected aquatic animals from a deterrence zone, comprising a submersible unit having a structural member supporting an operating assembly comprising:

a water conduit having an inlet and an outlet;

a pump mounted in-line in the water conduit, between the inlet and the outlet;

a surge tank in fluid communication with the water conduit between the pump and the outlet; and a flow interrupter fitting at the outlet.

24. The underwater deterrent system for repelling selected aquatic animals from a deterrence zone in accordance with claim 23 wherein the structural member is a rigid cage.

25. The underwater deterrent system for repelling selected aquatic animals from a deterrence zone in accordance with claim 23 wherein the operating assembly further comprises drive means actuated by water flow from the pump for driving the flow interrupter fitting.

26. The underwater deterrent system for repelling selected aquatic animals from a deterrence zone in accordance with claim 23 wherein the operating assembly further comprises a submersible electric motor to drive the flow interrupter fitting.

\* \* \* \* \*